US009945297B2

(12) United States Patent
Tsuyuki et al.

(10) Patent No.: US 9,945,297 B2
(45) Date of Patent: Apr. 17, 2018

(54) ENGINE CONTROLLER AND ENGINE CONTROL METHOD

(71) Applicant: NISSAN MOTOR CO., LTD., Yokohama-shi, Kanagawa (JP)

(72) Inventors: Takeshi Tsuyuki, Kanagawa (JP); Yoshihiro Imaoka, Kanagawa (JP); Takao Inoue, Kanagawa (JP)

(73) Assignee: NISSAN MOTOR CO., LTD., Yokohama-shi, Kanagawa (JP)

( * ) Notice: Subject to any disclaimer, the term of this patent is extended or adjusted under 35 U.S.C. 154(b) by 0 days.

(21) Appl. No.: 15/565,474

(22) PCT Filed: Apr. 16, 2015

(86) PCT No.: PCT/JP2015/061682
§ 371 (c)(1),
(2) Date: Oct. 10, 2017

(87) PCT Pub. No.: WO2016/166859
PCT Pub. Date: Oct. 20, 2016

(65) Prior Publication Data
US 2018/0073445 A1     Mar. 15, 2018

(51) Int. Cl.
*F02D 13/02*     (2006.01)
*F02D 41/38*     (2006.01)
(Continued)

(52) U.S. Cl.
CPC ..... *F02D 13/0261* (2013.01); *F02D 13/0265* (2013.01); *F02D 41/006* (2013.01);
(Continued)

(58) Field of Classification Search
CPC ............. F02D 13/0261; F02D 13/0265; F02D 41/006; F02D 41/0235; F02D 41/024;
(Continued)

(56) References Cited

U.S. PATENT DOCUMENTS 6,230,683 B1 *   5/2001   zur Loye ................. F02B 1/12
                                                      123/27 GE
6,340,014 B1 *   1/2002   Tomita ................. F02D 41/024
                                                      123/295

(Continued)

FOREIGN PATENT DOCUMENTS

JP       2002-227669 A      8/2002
JP       2005-214102 A      8/2005
(Continued)

*Primary Examiner* — Erick Solis
(74) *Attorney, Agent, or Firm* — Drinker Biddle & Reath LLP

(57) ABSTRACT

An engine controller controls a direct fuel-injection engine including a fuel injection valve for directly injecting a fuel into a cylinder and a valve overlap period adjusting mechanism for adjusting a valve overlap period between an open period of an intake valve and an open period of an exhaust valve. The engine controller is provided with an acceleration request sensor for detecting an acceleration request of a driver, and when the acceleration request occurs and a top surface temperature of a piston in the cylinder is lower than a predetermined temperature, the engine controller extends the valve overlap period between the open period of the intake valve and the open period of the exhaust valve, ranging before and after an exhaust top dead center.

8 Claims, 20 Drawing Sheets

(51) Int. Cl.
  *F02D 41/10* (2006.01)
  *F02M 26/01* (2016.01)
  *F02D 41/00* (2006.01)
  *F02D 41/02* (2006.01)
  *F02M 26/00* (2016.01)

(52) U.S. Cl.
  CPC ......... *F02D 41/0255* (2013.01); *F02D 41/10* (2013.01); *F02D 41/38* (2013.01); *F02M 26/01* (2016.02); *F02D 2041/389* (2013.01); *F02D 2200/021* (2013.01); *F02D 2200/602* (2013.01); *F02M 2026/004* (2016.02)

(58) Field of Classification Search
  CPC ............. F02D 41/0245; F02D 41/0255; F02D 41/068; F02M 26/01; F02M 2026/004
  USPC ....................... 123/90.15–90.18, 568.14, 295
  See application file for complete search history.

(56) References Cited

U.S. PATENT DOCUMENTS

| | | | |
|---|---|---|---|
| 2003/0070637 A1* | 4/2003 | Majima | F01L 9/04 123/90.15 |
| 2005/0166891 A1 | 8/2005 | Fukasawa | |
| 2005/0183693 A1* | 8/2005 | Yang | F02D 13/0207 123/305 |
| 2006/0266313 A1* | 11/2006 | Ishikawa | F02D 13/02 123/90.15 |
| 2009/0299610 A1* | 12/2009 | Kumano | F02D 13/0203 701/105 |
| 2010/0071659 A1* | 3/2010 | Moriya | F02D 13/0238 123/406.41 |
| 2015/0013637 A1* | 1/2015 | Kassai | F02D 41/068 123/294 |
| 2015/0152793 A1* | 6/2015 | Matsuda | F02D 17/00 60/285 |
| 2016/0084150 A1 | 3/2016 | Kawabe et al. | |
| 2016/0115876 A1* | 4/2016 | Hoshi | F02D 41/345 123/90.15 |

FOREIGN PATENT DOCUMENTS

| | | |
|---|---|---|
| JP | 2006-299816 A | 11/2006 |
| JP | 2007-154823 A | 6/2007 |
| JP | 2009-2184 A | 1/2009 |
| JP | 2009-85014 A | 4/2009 |
| JP | 2009-167887 A | 7/2009 |
| JP | 2012-241537 A | 12/2012 |
| JP | 2012-246797 A | 12/2012 |
| JP | 2015-10546 A | 1/2015 |

* cited by examiner

ENGINE CONTROLLER AND ENGINE CONTROL METHOD

TECHNICAL FIELD

The present invention relates to an engine controller for controlling a direct fuel-injection, spark-ignition engine and an engine control method for controlling the same.

BACKGROUND ART

In an exhaust passage of an engine, a catalyst device for purifying an exhaust gas is disposed in general. A catalyst carried by the catalyst device does not exert a favorable catalytic function at a temperature less than an activation temperature and thus, a warm-up operation for raising a temperature of the catalyst to the activation temperature early is needed at start of the engine. As a method of the warm-up operation, there is a method of raising the temperature of the catalyst by raising a temperature of the exhaust gas by retarding ignition timing. Moreover, in such warm-up operation, in order to ensure favorable ignitability even in a state where the ignition timing is retarded, a so-called stratified charge combustion in which spark ignition is performed in a state where fuel spray is concentrated in the vicinity of an ignition plug is performed in some cases.

SUMMARY OF INVENTION

In such warm-up operation, if a load is rapidly applied due to acceleration or the like, the stratified charge combustion as above is switched to uniform stoichiometric combustion. An emission reduction method when the load is changed as above has been considered. JP2009-2184A discloses HPLEGR using an HPL passage connecting an exhaust passage on an upstream of a turbine to an intake passage on a downstream of a compressor and LPLEGR using an LPL passage connecting the exhaust passage on a downstream of the turbine and the intake passage on an upstream of the compressor. And control for switching between HPLEGR and LPLEGR is disclosed. Moreover, JP2009-167887A discloses control of an EGR valve opening degree on the basis of a piston temperature in an internal combustion engine having an external EGR.

However, these methods do not consider suppression of a generation amount of Particulate Matter (PM) at all. Thus, suppression on an increase of a PM emission (hereinafter also referred to as PN: Particulate Number) in acceleration when a temperature of a piston top surface is low is difficult.

Thus, the present invention has an object to control an engine so that an increase in PN in acceleration can be suppressed, when the temperature of the piston top surface is low.

According to one aspect of the present invention, an engine controller that controls a direct fuel-injection engine is provided, which engine includes a fuel injection valve arranged to directly inject a fuel into a cylinder, and a valve overlap period adjusting mechanism configured to adjust a valve overlap period between an open period of an intake valve and an open period of an exhaust valve. The engine controller of the aspect is provided with an acceleration request sensor configured to detect an acceleration request of a driver, and when the acceleration request occurs and a top surface temperature of a piston in the cylinder is lower than a predetermined temperature, the valve overlap period between the open period of the intake valve and the open period of the exhaust valve, which overlap period ranges before and after an exhaust top dead center, is extended.

DESCRIPTION OF EMBODIMENTS

Hereinafter, embodiments of the present invention will be described by referring to the attached drawings.

First Embodiment

Figure 1:
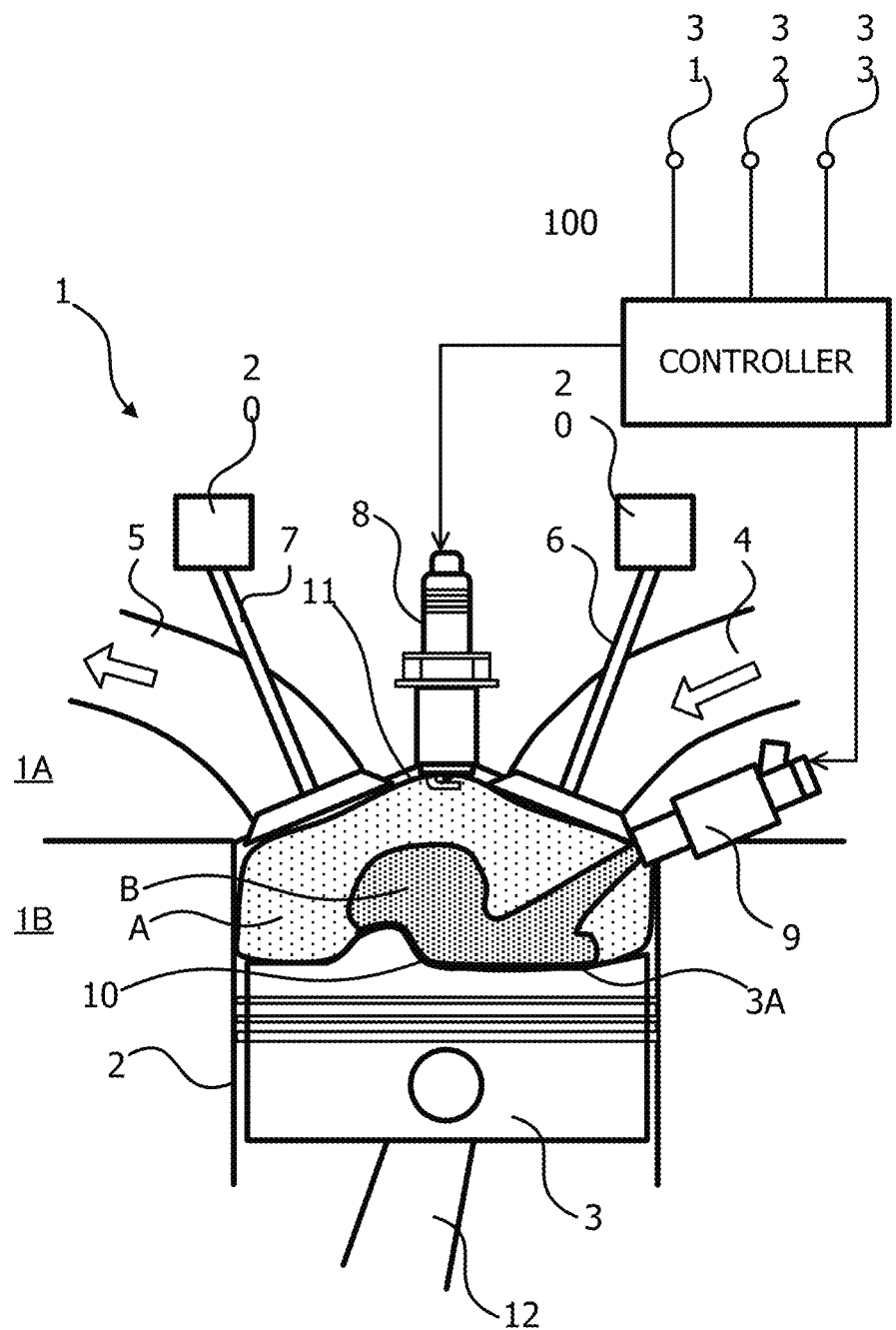
FIG. 1 is a schematic configuration view around a combustion chamber of a direct fuel-injection, spark-ignition engine to which this embodiment is applied.

FIG. 1 is a schematic configuration view around a combustion chamber of a direct fuel-injection, spark-ignition engine (hereinafter also referred to as an "engine") 1 to which this embodiment is applied. Only one cylinder is illustrated in FIG. 1, but this embodiment can be also applied to a multi-cylinder engine.

A cylinder block 1B of the engine 1 includes a cylinder 2. The cylinder 2 accommodates a piston 3 capable of a reciprocating motion. The piston 3 is connected to a crank shaft, not shown, through a connecting rod 12 and is reciprocated by rotation of the crank shaft. Moreover, the piston 3 includes a cavity 10 which will be described later on a top surface 3A (hereinafter also referred to as a piston top surface 3A).

A cylinder head 1A of the engine 1 includes a recess-shaped combustion chamber 11. The combustion chamber 11 is constituted having a so-called pent-roof type, and a pair of intake valves 6 is disposed on an inclined surface on an intake side, while a pair of exhaust valves 7 on an inclined surface on an exhaust side, respectively. And an ignition plug 8 is disposed so as to follow an axis of the cylinder 2 at a substantially center position of the combustion chamber 11 sounded by these pair of intake valves 6 and pair of exhaust valves 7.

Moreover, at a position sandwiched by the pair of intake valves 6 on the cylinder head 1A, a fuel injection valve 9 is disposed so as to face the combustion chamber 11. Directivity of fuel spray injected from the fuel injection valve 9 will be described later.

The intake valve 6 and the exhaust valve 7 are driven by a valve timing control mechanism 20 as a valve overlap period adjusting mechanism. The valve timing control mechanism 20 only needs to be capable of changing valve timing of the intake valve 6 and the exhaust valve 7, that is, valve opening timing and valve closing timing so that the valve overlap period during which both the intake valve 6 and the exhaust valve 7 are open is generated. The valve opening timing is timing when a valve opening operation is started, and the valve closing timing is timing when a valve closing operation is finished. In this embodiment, a known valve timing control mechanism 20 for changing a rotation phase with respect to a crank shaft of a cam shaft for driving the intake valve 6 and a cam shaft for driving the exhaust valve 7 is used. A known valve timing control mechanism which can change not only a rotation phase but also operation angles of the intake valve 6 and the exhaust valve 7 may also be used. Moreover, as the valve timing control mechanism 20, not only those capable of adjusting both the opening/closing timing of the intake valve 6 and the exhaust valve 7 but also those capable of adjusting only either one of them may also be used. Other mechanisms may also be employed even if only the opening/closing timing of the intake valve 6 can be adjusted, for example, as long as the valve overlap period between an open period of the intake valve 6 and an open period of the exhaust valve 7 can be adjusted to be extended or shortened.

On a downstream side of an exhaust flow in an exhaust passage 5, an exhaust gas purifying catalyst for purifying the exhaust gas of the engine 1 is interposed. The exhaust gas purifying catalyst is a three-way catalyst, for example.

The piston 3 includes the cavity 10 in the piston top surface 3A as described above. The cavity 10 is provided at a position biased to the intake side on the piston top surface 3A. The fuel injection valve 9 is disposed so that the fuel spray is directed to this cavity 10 at the fuel injection when the piston 3 is in the vicinity of a top dead center. It has a shape such that the fuel spray colliding against the cavity 10 is blown up along a wall surface of the cavity 10 and goes toward a direction of the ignition plug 8.

A fuel injection amount, fuel injection timing, ignition timing and the like of the engine 1 are controlled by a controller 100 in accordance with an operating state of the engine 1. The fuel injection timing is timing when the fuel injection is started. Moreover, in order to execute such control, the engine 1 includes various detecting devices such as a crank-shaft angle sensor, a cooling water temperature sensor 32, an air flowmeter for detecting an intake air amount, an accelerator position sensor 31 for detecting an accelerator pedal depression amount, a catalyst temperature sensor 33 for detecting a temperature of the exhaust gas purifying catalyst directly or indirectly and the like. The accelerator position sensor 31 functions as an acceleration request sensor for detecting an acceleration request by a driver, but the acceleration request sensor is not limited to this. For example, those operating an accelerator by hand can be also applied, and a form of an operator is not limited as long as an acceleration request amount can be detected.

Subsequently, control at start of the engine 1 executed by the controller 100 will be described. In this embodiment, it is assumed that so-called two-stage injection in which a fuel amount required for one combustion cycle is injected in two sessions is performed.

The exhaust gas purifying catalyst does not exert a sufficient purification performance at a temperature lower than an activation temperature. Thus, at a cold start when the exhaust gas purifying catalyst is at a temperature lower than the activation temperature, the temperature of the exhaust gas purifying catalyst needs to be raised earlier. Thus, in an idle state immediately after the cold start and when the exhaust gas purifying catalyst is in an inactive state, the controller 100 executes super-retard stratified charge combustion in order to activate the exhaust gas purifying catalyst earlier. The super-retard stratified charge combustion itself is known (see Japanese Patent Laid-Open No. 2008-25535).

In the super-retard stratified charge combustion, the controller 100 sets ignition timing to a first half of an expansion stroke, that is, to 15-30 deg after compression top dead center, for example. Moreover, the controller 100 sets a first session of fuel injection timing to a first half of an intake stroke and a second session of the fuel injection timing to a second half of a compression stroke which is timing when the fuel spray can reach the periphery of the ignition plug 8 by the time of the ignition timing or to 50-60 deg before the compression top dead center, for example.

Here, a first fuel injection amount and a second fuel injection amount will be described.

An air-fuel ratio of the exhaust gas exhausted in the super-retard stratified charge combustion described above is stoichiometric (stoichiometric air-fuel ratio). The controller 100 calculates a fuel amount (hereinafter also referred to as a total fuel amount) which can be completely burned by an intake air amount per one combustion cycle similarly to a general fuel injection amount setting method. A part of this total fuel amount or 50-90 weight %, for example, is set to the first injection amount, while the remaining is set to the second injection amount.

By setting the fuel injection amount as above, the fuel spray injected in the first fuel injection is diffused in the cylinder 2 without colliding against the cavity 10, is mixed with air and forms a uniform mixture which is leaner than the stoichiometric over the whole area of the combustion chamber 11. The fuel spray injected in the second fuel injection collides against the cavity 10 and is blown up so as to reach the vicinity of the ignition plug 8 and forms the mixture richer than the stoichiometric around the ignition plug 8 in a concentrated manner. As a result, the mixture in the combustion chamber 11 enters a stratified charge state. By performing spark-ignition with the ignition plug 8 in this state, combustion resistant against disturbance in which misfire or smoke generation is suppressed is performed. The aforementioned combustion is the stratified charge combustion, but in order to discriminate it from the general stratified charge combustion that the ignition timing is before the compression top dead center, it is called super-retard stratified charge combustion.

According to the super-retard stratified charge combustion as above, not only that the exhaust temperature can be raised as compared with the conventional uniform stoichiometric combustion but a hydrocarbon (HC) emission from the combustion chamber 11 to the exhaust passage 5 can be reduced. That is, according to the super-retard stratified charge combustion, earlier activation of the exhaust gas purifying catalyst can be realized while emission of the HC to the atmospheric air from start of the engine to activation of the exhaust gas purifying catalyst is suppressed as compared with warm-up further performed only in the conventional uniform stoichiometric combustion, only in the stratified charge combustion or in a combustion form in which an additional fuel is injected at a second half of combustion and after (in the expansion stroke and after and during the exhaust stroke) or the like. Here, the super-retard stratified charge combustion is assumed to be performed in two-stage fuel injection, but the number of fuel injection stages is not limited to that.

A part of the fuel colliding against the piston top surface 3A during performance of the super-retard stratified charge combustion is not blown up in the direction of the ignition plug 8 but adheres to the piston top surface 3A. Even if the fuel adheres to the piston top surface 3A, if the adhering fuel is evaporated and burned in the combustion cycle, the fuel does not remain on the piston top surface 3A. However, since the super-retard stratified charge combustion is performed at a cold start, the adhering fuel cannot be evaporated easily until the temperature of the piston top surface 3A is raised. Moreover, if the adhering fuel is burned by propagation of a combustion flame in the combustion cycle, the fuel does not remain on the piston top surface 3A. However, since the combustion is started in the expansion stroke in the super-retard stratified charge combustion, the combustion flame does not reach the piston top surface 3A or it reaches the piston top surface 3A in a state where the temperature is lowered in the second half of the expansion stroke and thus, it is difficult to burn up the adhering fuel in the cycle. A phenomenon that the liquid fuel remaining on the piston top surface 3A is ignited by the combustion flame and burned is called pool-fire.

Therefore, for a predetermined period from the cold start, the liquid fuel remaining on the piston top surface 3A continuously increases. The predetermined period, here, means a period during which an amount of evaporation of the liquid fuel remaining on the piston top surface 3A during 1 combustion cycle is larger than an amount of adhesion on the piston top surface 3A in the 1 combustion cycle.

That is, if the super-retard stratified charge combustion is continued beyond the predetermined period, the liquid fuel remaining on the piston top surface 3A gradually decreases. However, the super-retard stratified charge combustion is switched to the uniform stoichiometric combustion in a state where the liquid fuel remains on the piston top surface 3A before the predetermined period has elapsed in some cases. It is such a case where an accelerator pedal is depressed for acceleration, for example. The uniform stoichiometric combustion, here, is a combustion form in which the mixture at a stoichiometric air-fuel ratio is formed in the whole combustion chamber 11 and spark-ignited.

When the accelerator pedal is depressed for acceleration while the super-retard stratified charge combustion is being performed, control is switched to normal control. The normal control in this embodiment is control in which spark-ignition is performed at optimal ignition timing (MBT: minimum advance for best torque) in the uniform stoichiometric combustion. The MBT in the uniform stoichiometric combustion in general is ignition timing slightly more advanced than TDC. The fuel injection at this time is intake stroke injection.

When the super-retard stratified charge combustion is switched so that the uniform stoichiometric combustion is performed at the MBT in the state where the liquid fuel remains on the piston top surface 3A, the combustion flame still at a high temperature reaches the piston top surface 3A and causes pool-fire, and the remaining liquid fuel is burned. Then, when the liquid fuel accumulated until the combustion cycle this time is burned, the PN tends to increase.

Thus, in this embodiment, in order to suppress an increase in the PN caused by burning of the liquid fuel, the controller 100 executes control described below.

Figure 2:
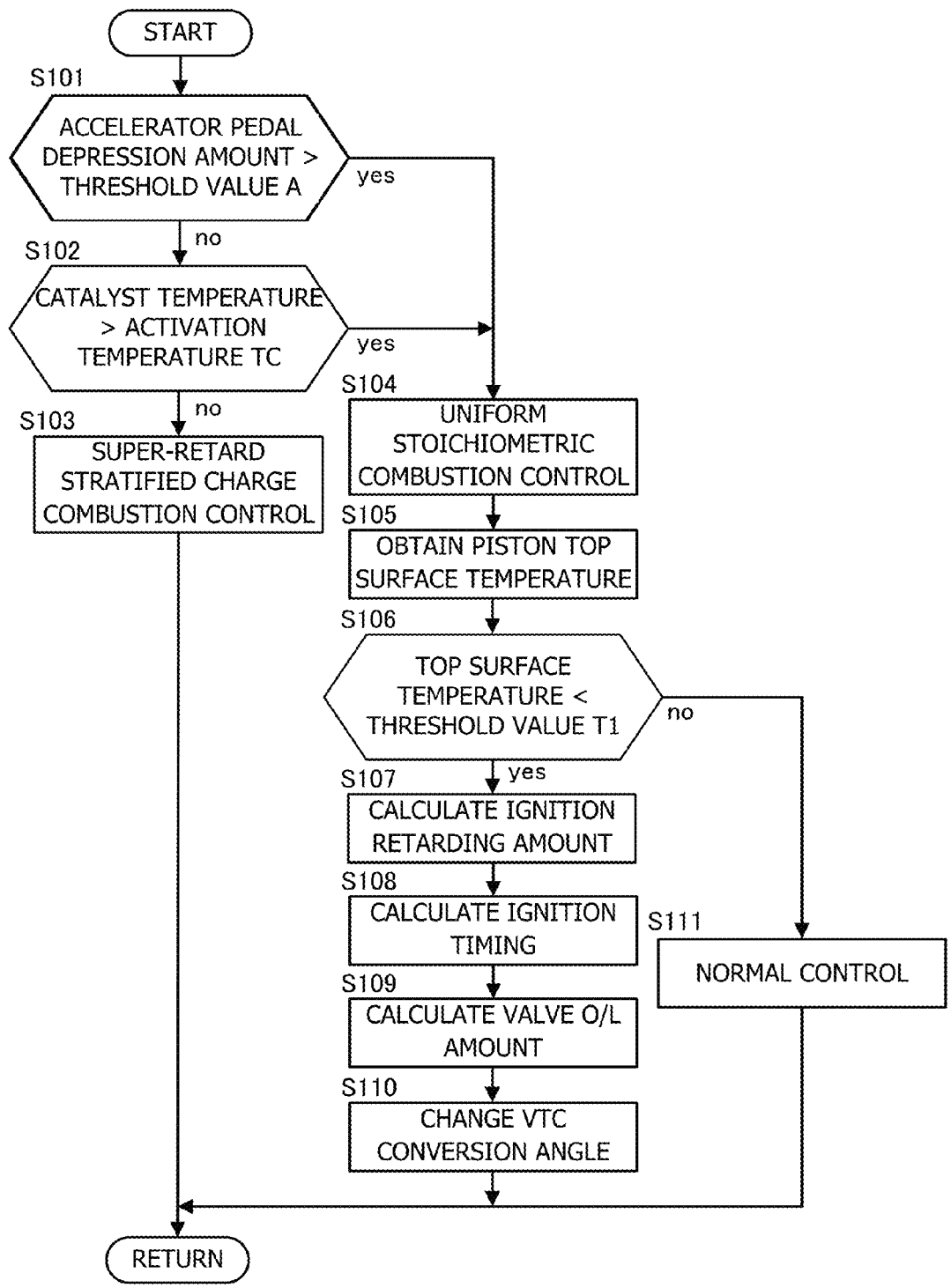
FIG. 2 is a flowchart illustrating a control routine for suppressing an increase in PN.

FIG. 2 is a flowchart illustrating a control routine for suppressing an increase in the PN. This control routine is executed by the controller 100. This routine is repeatedly executed at a short interval of approximately 10 milliseconds, for example.

This routine is to retard the ignition timing in order to suppress PM generation caused by contact of the liquid fuel remaining on the piston top surface 3A with the flame. Moreover, it is to extend a valve overlap period in order to reduce a liquid fuel amount remaining on the piston top surface 3A (hereinafter referred to simply as a "liquid fuel amount"). Explanation will be made below in accordance with steps of the flowchart.

At Step S101, the controller 100 determines whether the accelerator pedal has been depressed larger than a predetermined amount A continuously from the super-retard stratified charge combustion. Here, the predetermined amount A is a depression amount to such a degree that it is found that a driver has an intension of acceleration. This predetermined amount A is set in advance. Moreover, whether it is during the super-retard stratified combustion or not can be determined on the basis of the temperature of the exhaust gas purifying catalyst at this time. Specifically, if the exhaust gas purifying catalyst is less than the activation temperature, it is determined to be during performance, while if it is at the activation temperature or above, it is determined to be not in performance.

When the accelerator pedal has not been depressed larger than the predetermined amount A at Step S101, the controller 100 determines whether or not the catalyst temperature exceeds the activation temperature TC of the catalyst (S102). Then, if the catalyst temperature has not exceeded the activation temperature TC of the catalyst, the controller 100 continuously executes the aforementioned super-retard stratified charge combustion control (S103).

On the other hand, if the accelerator pedal has been depressed larger than the predetermined amount A at Step S101 or if the catalyst temperature exceeds the activation temperature TC of the catalyst at Step S102, the controller 100 executes the uniform stoichiometric combustion control (S104). The uniform stoichiometric combustion is a combustion form of spark-ignition in which the mixture at the stoichiometric air-fuel ratio is formed in the whole combustion chamber 11 as described above. Even though the catalyst temperature exceeds the activation temperature TC, the processing is proceeded to Step S104, and control according to the temperature of the piston top surface 3A is to be executed at Step S105 which will be described later because, even if the catalyst has been activated, the temperature of the piston top surface 3A is not necessarily raised, and the PN can increase in some cases if the temperature of the piston top surface 3A is low.

Subsequently, at Step S105, the controller 100 obtains the temperature of the piston top surface 3A (hereinafter referred to simply as a "piston top surface temperature" in some cases). In this embodiment, the piston top surface temperature can be acquired from a detection value of a cooling water temperature sensor 32. For example, by acquiring a relationship between the temperature obtained by the existing cooling water temperature sensor 32 and the piston top surface temperature in advance, the piston temperature can be obtained in control of the engine 1 on the basis of the temperature obtained by the existing cooling water temperature sensor 32.

At Step S106, the controller 100 determines whether or not the piston top surface temperature obtained at Step S105 is less than a threshold value T1 set in advance. If the piston top surface temperature is less than the threshold value T1, the controller 100 executes processing at Step S107, while if it is at the threshold value T1 or above, the controller 100 executes processing at Step S111.

For the threshold value T1 used at this Step, a value which can satisfy an emission regulated value of the PN even if the super-retard stratified charge combustion is switched to the normal control is set in advance. The threshold value T1 can be considered to be, in other words, a temperature of a boundary between a temperature at which the liquid fuel adhering to the piston top surface 3A can be evaporated or burned in 1 cycle and a temperature which is not. Then, the temperature at which evaporation or combustion cannot be made in 1 cycle can be considered as a temperature at which the liquid fuel adhering to the piston top surface 3A is brought over to the subsequent cycle in a liquid state and becomes a factor of generating the particulate matters (PM). Since it was found that a flame can occur by the liquid fuel in acceleration in some cases even if the piston top surface 3A is not wetted, the threshold value T1 may be a temperature of a boundary between that temperature and a temperature at which the flame does not occur.

At Step S107, the controller 100 calculates a retarding amount of the spark-ignition timing as will be described later. The retarding amount of the spark-ignition timing (hereinafter referred to simply as "ignition timing" in some cases) is calculated by preparing a table illustrated in FIG. 3 in advance and storing it in the controller 100 and by searching this table with the piston top surface temperature.

Figure 3:
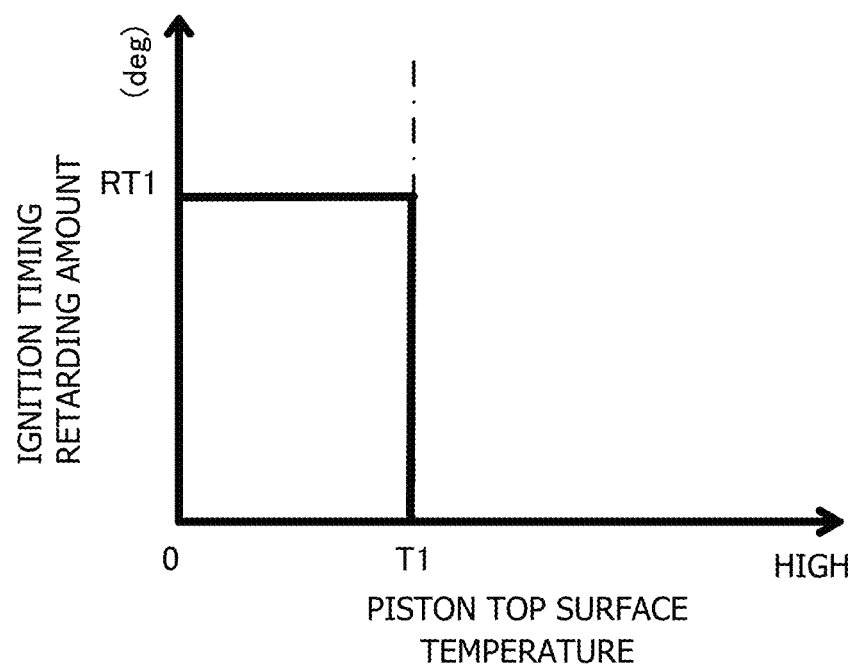
FIG. 3 is a table for setting a retarding amount of spark ignition timing in a first embodiment.

FIG. 3 is a table for setting the retarding amount of the spark-ignition timing in the first embodiment. In FIG. 3, a vertical axis indicates the retarding amount of the ignition timing, while a lateral axis indicates the piston top surface temperature. The retarding amount of the ignition timing is zero in a case where a temperature T of the piston top surface 3A is T>threshold value T1 and RT1 in the case of the threshold value T1≥T.

At Step S108, the controller 100 sets the ignition timing. Specifically, new ignition timing is calculated from the ignition timing for the normal uniform stoichiometric combustion and the retarding amount RT1 of the ignition timing calculated at Step S107.

Figure 4:
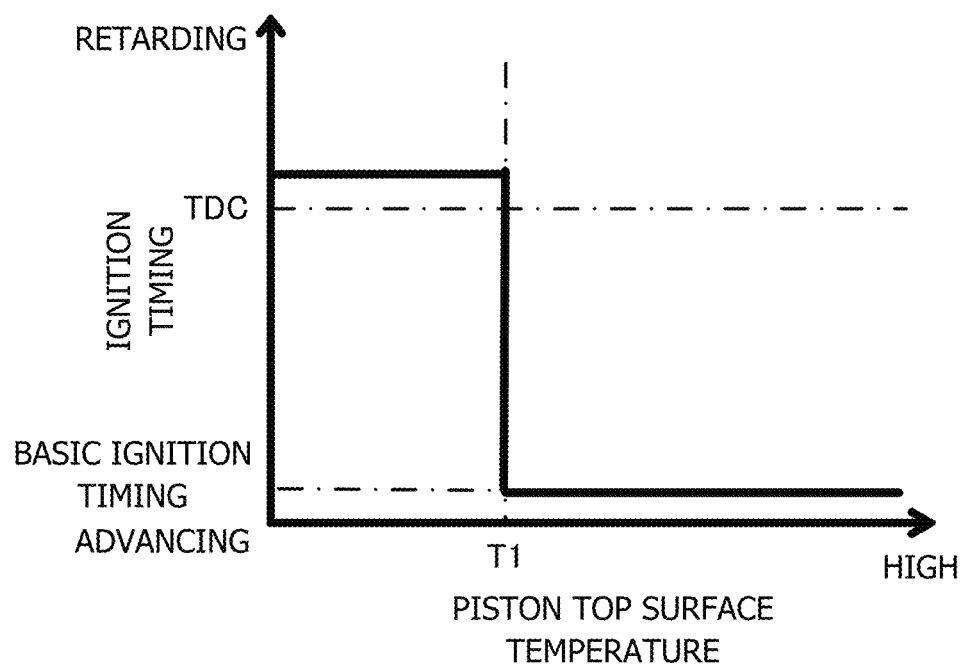
FIG. 4 is a view illustrating the spark ignition timing in the first embodiment.

FIG. 4 is a view illustrating the spark ignition timing in the first embodiment. FIG. 4 illustrates an example of the ignition timing when the processing at the aforementioned Steps S107 and S108 are executed. A vertical axis in FIG. 4 indicates the ignition timing, while a lateral axis indicates the piston top surface temperature T. When the piston top surface temperature T is less than the threshold value T1, the ignition timing is set such that the basic ignition timing (MBT) in the uniform stoichiometric combustion in the normal control is retarded only by the retarding amount RT1.

If the ignition timing is not retarded, here, the flame propagated by the ignition soon reaches the piston top surface 3A. Then, the flame is brought into contact with the liquid fuel remaining in the cavity earlier, which increases the PN. However, if the ignition timing is retarded as described above, the flame propagating by the ignition does not reach the piston top surface 3A or even if it reaches, it reaches with a delay and thus, contact time of the flame with the piston top surface 3A can be reduced. And a combustion amount of the liquid fuel remaining on the piston top surface 3A can be reduced so that the increase in the PN can be suppressed. Moreover, if the ignition timing is retarded, the temperature of the flame is lowered in the expansion stroke and the flame reaches the piston top surface 3A and thus, even if the pool-fire occurs, its size can be reduced. Moreover, the increase in the PN can be suppressed.

It may be so configured that a table of the ignition timing for an estimated amount of the liquid fuel remaining on the piston top surface 3A (hereinafter referred to as a "liquid fuel estimated amount" in some cases) is prepared, and the liquid fuel estimated amount is acquired by referring to this table when the ignition timing is retarded at Step S107 and Step S108. The liquid fuel estimated amount has a correlation with the piston top surface temperature. If the piston top surface temperature is high, the liquid fuel can be evaporated easily and thus, the liquid fuel estimated amount on the piston top surface 3A decreased. On the other hand, if the piston top surface temperature is low, the liquid fuel is not evaporated easily, the liquid fuel estimated amount on the piston top surface 3A increases.

Thus, the table is set such that the larger the liquid fuel estimated amount is, the larger the retarding amount of the spark ignition timing becomes. The larger the liquid fuel estimated amount is, the upper the ignition timing retarding amount in FIG. 3 is shifted in the table. The larger the liquid fuel estimated amount is, the more the PN increases when the liquid fuel is brought into contact with the flame. However, by calculating the retarding amount of the ignition timing as above, the contact time of the flame with the liquid fuel on the piston top surface 3A can be reduced. And the increase in the PN can be suppressed.

Figure 5:
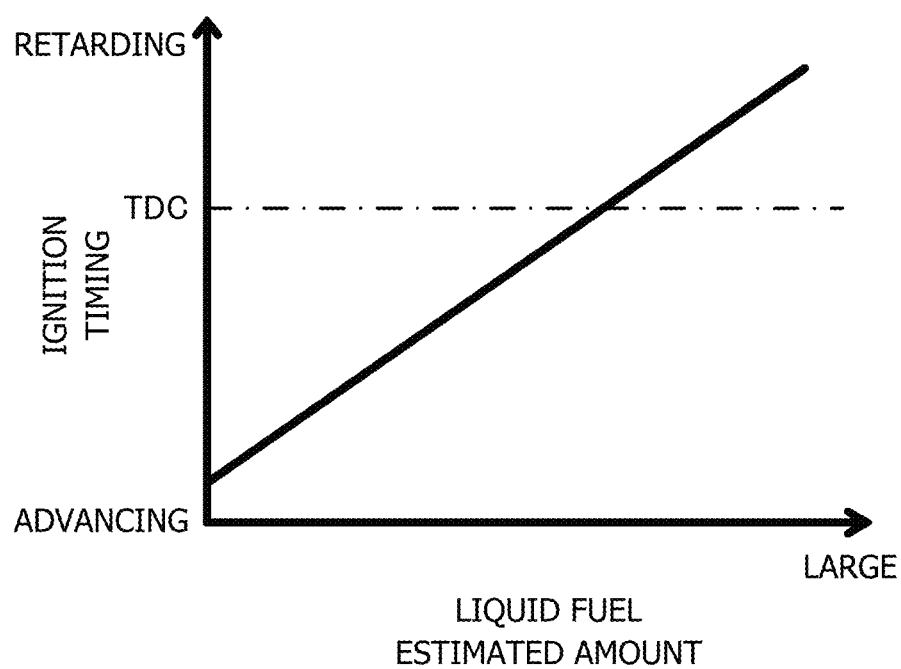
FIG. 5 is a view when the ignition timing is changed linearly with respect to a liquid fuel estimated amount.

FIG. 5 is a view when the ignition timing is changed linearly with respect to the liquid fuel estimated amount. Even if the ignition timing is changed linearly with respect to the liquid fuel estimated amount as above, the increase in the PN can be suppressed by the action similar to the above.

Figure 6:
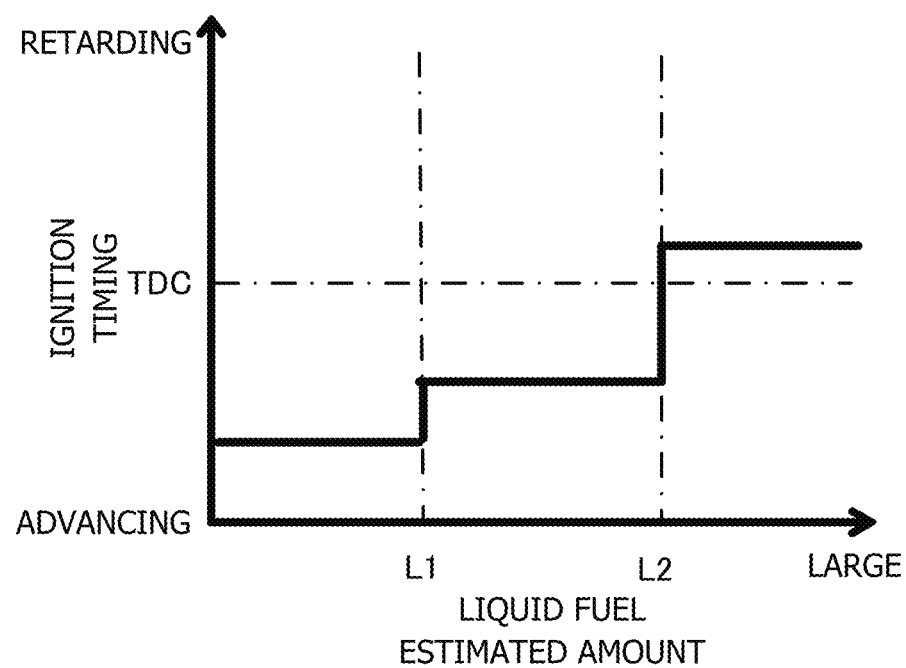
FIG. 6 is a view when the ignition timing is changed in steps with respect to the liquid fuel estimated amount.

FIG. 6 is a view when the ignition timing is changed in steps with respect to the liquid fuel estimated amount. Even if the ignition timing is changed in steps with respect to the liquid fuel estimated amount as above, the increase in the PN can be suppressed by the action similar to the above.

In estimating the liquid fuel amount, the liquid fuel amount can be estimated on the basis of the piston top surface temperature and elapsed time from the engine start. Specifically, first, on the basis of a characteristic that the lower the piston top surface temperature is, the more easily the liquid fuel remains on the piston top surface 3A, a remaining amount per unit time is determined for each piston top surface temperature, and an integrated amount of adhesion on the piston top surface 3A is calculated by integrating the elapsed time since the engine start to this value. Subsequently, an evaporation amount which will be described later is subtracted from this integrated amount, and the result is made an estimated amount of the liquid fuel.

The aforementioned evaporation amount is an evaporated amount in the fuel adhering to the piston top surface 3A. Since the higher the temperature is, the more easily the fuel can be evaporated, the higher the temperature of the piston top surface 3A is, the larger the evaporation amount becomes.

Moreover, it may be so configured that a table of the ignition timing with respect to the fuel injection amount to the piston top surface 3A is prepared, and the table according to the fuel injection amount is selected when the ignition timing is retarded at Step S107 and Step S108. The larger the fuel injection amount is, the larger the remaining amount of the liquid fuel on the piston top surface 3A becomes. On the other hand, the smaller the fuel injection amount is, the smaller the remaining amount of the liquid fuel on the piston top surface 3A becomes.

Thus, the retarding amount of the ignition timing is set larger for the table in the case of the larger fuel injection amount. The larger the fuel injection amount is, the upper the retarding amount of the ignition timing in FIG. 3 is shifted in the table. Since the larger the fuel injection amount is, the larger the liquid fuel estimated amount remaining on the piston top surface 3A becomes, when it is brought into contact with the flame, the PN increases. However, by calculating the retarding amount of the spark ignition timing as described above, the contact time of the flame with the liquid fuel on the piston top surface 3A can be reduced more reliably. Then, an increase in the PN can be suppressed.

Figure 7:
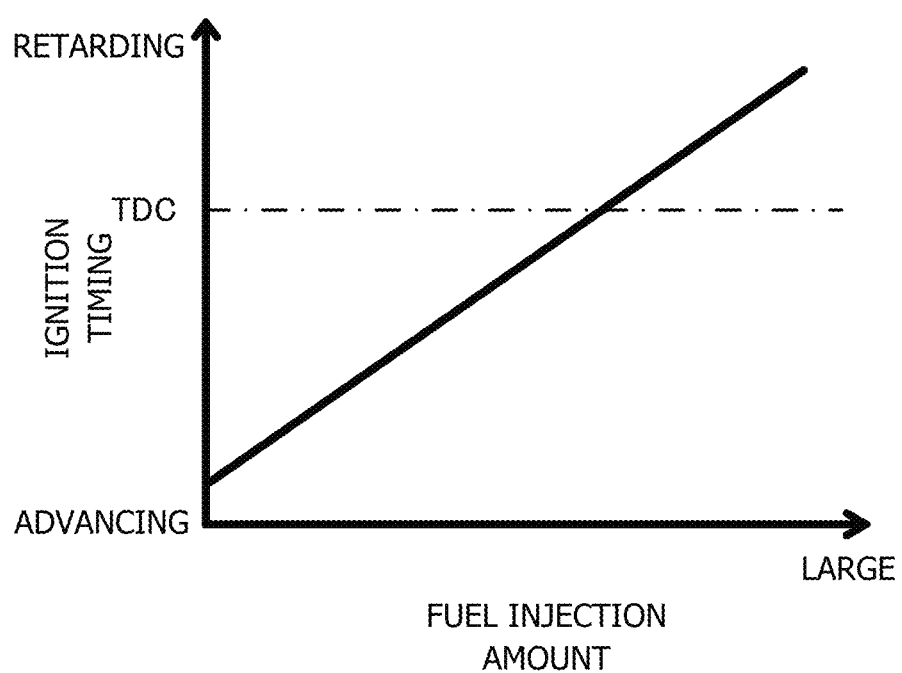
FIG. 7 is a view when the ignition timing is changed linearly with respect to a fuel injection amount.

FIG. 7 is a view when the ignition timing is changed linearly with respect to the fuel injection amount. Even if the ignition timing is changed linearly with respect to the fuel injection amount as above, the increase in the PN can be suppressed by the action similar to the above.

The explanation will be returned to that for the flowchart in FIG. 2.

At Step S109, the controller 100 calculates the valve overlap period on the basis of the piston top surface temperature T. The valve overlap period, here, means a period during which the intake valve 6 and the exhaust valve 7 are open continues as indicated by a crank angle.

Figure 8:
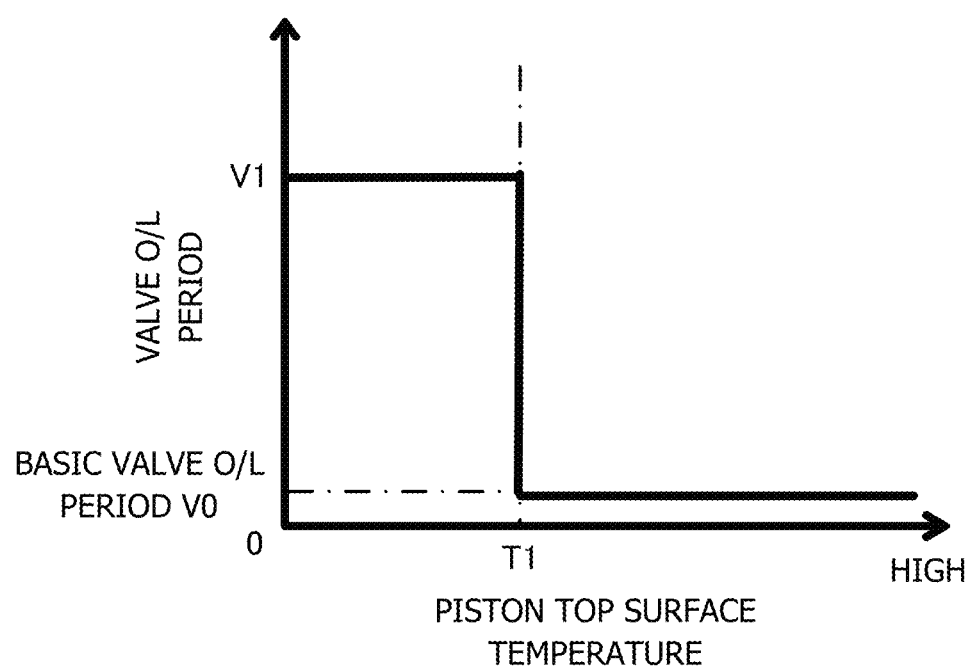
FIG. 8 is a table for setting a length of a valve overlap period in the first embodiment.

FIG. 8 is a table for setting a length of the valve overlap period in the first embodiment. In FIG. 8, a vertical axis indicates the valve overlap period, while a lateral axis indicates a piston top surface T. In FIG. 8, the valve overlap period is V1 in a case where the piston top surface temperature T is T<T1, while in the case of T≥T1, it is the basic overlap period V0. Here, a relationship of V0<V1 is formed.

When the valve overlap period is extended, a so-called internal EGR gas amount increases. Since the internal EGR gas has a high temperature, intake of this into the cylinder raises an in-cylinder temperature from the intake stroke to the ignition timing. When the in-cylinder temperature rises, a piston temperature also rises, and evaporation of the liquid fuel adhering to the cavity is promoted. Thus, the table in FIG. 8 is set such that, if the top surface temperature T is low, the valve overlap period is extended.

At Step S110, the controller 100 sets a conversion angle of the valve timing control mechanism 20 for realizing the valve overlap period calculated at Step S109 and changes the valve overlap amount. In more detail, the valve timing of the intake valve 6 and the exhaust valve 7 is calculated by a method which will be described later, and the conversion angle of the valve timing control mechanism 20 on the intake side and the exhaust side is changed on the basis of a calculation result.

Figure 9:
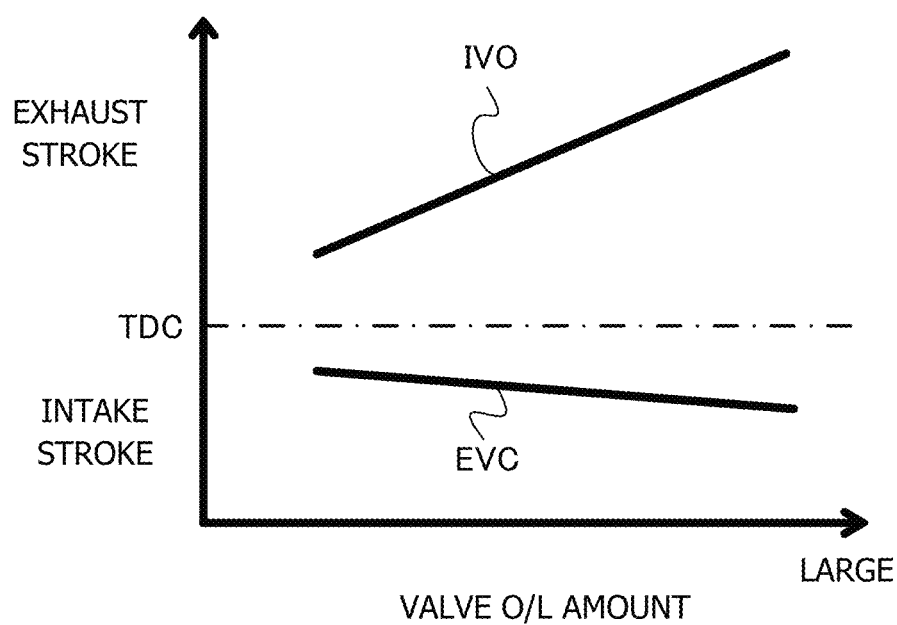
FIG. 9 is an explanatory view of a valve timing extension amount when the valve overlap period is extended.

FIG. 9 is an explanatory view of a valve timing extension amount in the valve overlap period extension. In this embodiment, as illustrated in FIG. 9, an advancing amount of opening timing of the intake valve 6 is set larger than a retarding amount of closing timing of the exhaust valve 7.

As described above, by extending the valve overlap period by further advancing the opening timing of the intake valve 6, an amount of the internal EGR gas returning to the intake port side can be increased in the exhaust stroke. The internal EGR gas having returned to the intake port flows into the cylinder in the subsequent intake stroke. Then, the so-called internal EGR amount can be effectively increased.

Figure 10:
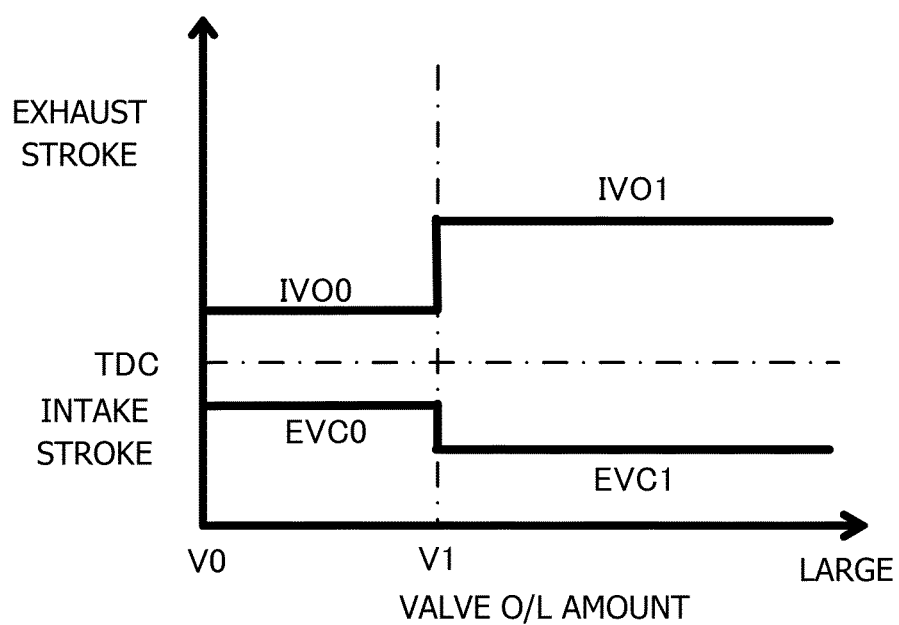
FIG. 10 is a table of valve timing in the first embodiment.

FIG. 10 is a table of the valve timing in the first embodiment. FIG. 10 is a table for acquiring the opening timing (IVO in the figure) of the intake valve 6 and the closing timing (EVC in the figure) of the exhaust valve 7 for realizing the valve overlap period calculated at Step S109. In FIG. 10, a vertical axis indicates the valve timing, while a lateral axis indicates a valve overlap amount. If the valve overlap period is the basic valve overlap period V0 (FIG. 8), the opening timing of the intake valve 6 is IVO0 and the closing timing of the exhaust valve 7 is EVC0. If the valve overlap period is V1, the opening timing of the intake valve 6 is IVO1 advanced from IVO0, and the closing timing of the exhaust valve 7 is EVC1 retarded from the EVC0. As described above, the opening timing of the intake valve 6 and the closing timing of the exhaust valve 7 are set so as to sandwich the exhaust top dead center whichever length the valve overlap period is.

As described above, in this embodiment, when the accelerator pedal is depressed larger than the predetermined amount A in the super-retard stratified charge combustion and when the piston top surface temperature T is less than the threshold value T1, the valve overlap period is extended and thus, the internal EGR is increased. When the internal EGR is increased, the in-cylinder temperature can be raised by the EGR gas at a high temperature. And by evaporating the liquid fuel on the piston top surface 3A, the liquid fuel collecting on the piston top surface 3A can be decreased. Then, the increase in the PN can be suppressed.

Moreover, the EGR gas has a characteristic of lowering the combustion temperature after the spark ignition since it lowers oxygen concentration in the cylinder. When the combustion temperature is low, generation of the PM can be suppressed in a chemical reaction manner. Thus, by extending the valve overlap period, the increase in the PN can be suppressed.

It may be so configured that a table of the valve overlap period with respect to the liquid fuel estimated amount remaining on the piston top surface 3A is prepared, and the valve overlap period is acquired by referring to this table when the valve overlap period is extended at Step S109 and Step S110. The liquid fuel estimated amount has a correlation with the piston top surface temperature. If the piston top surface temperature is high, the liquid fuel can be evaporated easily and thus, the liquid fuel estimated amount on the piston top surface 3A becomes smaller. On the other hand, if the piston top surface temperature is low, the liquid fuel is not evaporated easily and thus, the liquid fuel estimated amount on the piston top surface 3A becomes larger.

Figure 11:
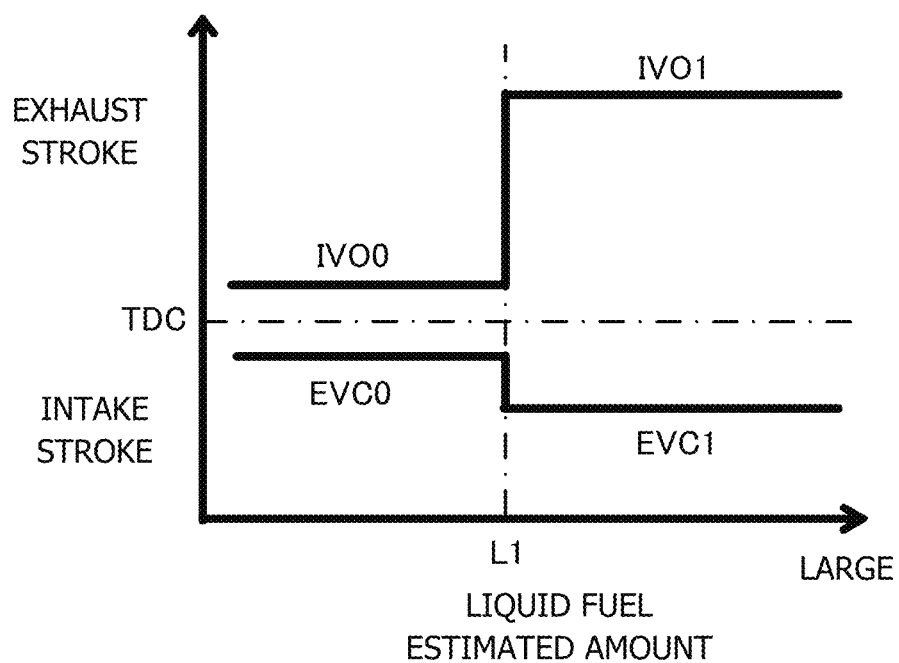
FIG. 11 is a table of the valve timing with respect to the liquid fuel estimated amount.

FIG. 11 is a table of the valve timing with respect to the liquid fuel estimated amount. As illustrated in FIG. 11, the table is set such that the larger the liquid fuel estimated amount, the longer the valve overlap period becomes. The larger the liquid fuel estimated amount is, the more the PN increases when the liquid fuel is brought into contact with the flame. However, by acquiring the valve overlap period as above, the liquid fuel amount remaining on the piston top surface 3A can be decreased. And the increase in the PN can be suppressed. Moreover, the effect of the internal EGR can be improved as described above and thus, the increase in the PN can be suppressed by that, too.

Figure 12:
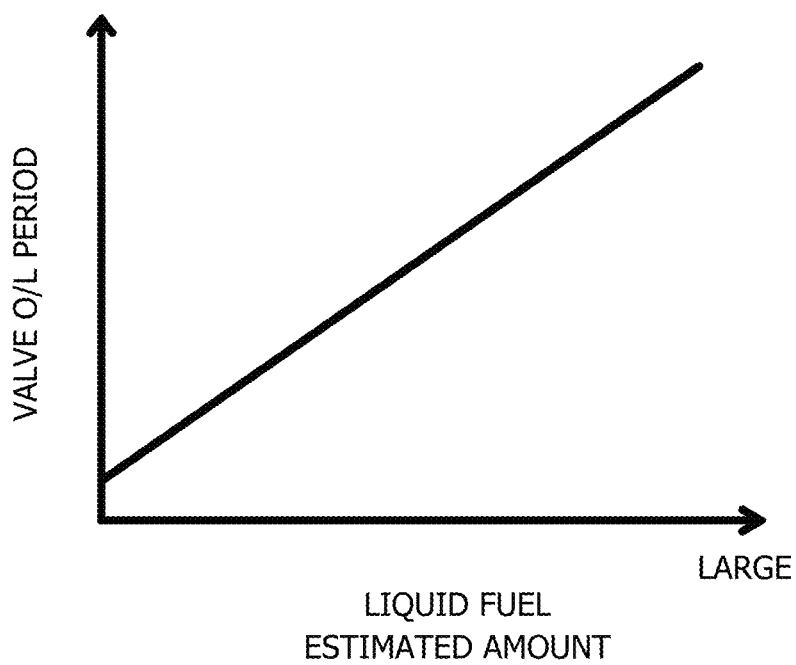
FIG. 12 is a view when the valve overlap period is changed linearly with respect to the liquid fuel estimated amount.

FIG. 12 is a view when the valve overlap period is changed linearly with respect to the liquid fuel estimated amount. As described above, even when the valve overlap period is changed linearly with respect to the liquid fuel estimated amount, the increase in the PN can be suppressed by the action similar to the above.

Moreover, it may be so configured that a table of the valve overlap period with respect to the fuel injection amount is prepared, and the valve overlap period is acquired by referring to this table when the valve overlap period is extended at step S109 and S110. If the fuel injection amount is large, the remaining amount of the liquid fuel on the piston top surface 3A becomes larger. On the other hand, if the fuel injection amount is small, the remaining amount of the liquid fuel on the piston top surface 3A becomes smaller.

Thus, the table is set such that the larger the fuel injection amount is, the longer the valve overlap period is set. The larger the fuel injection amount is, the upper the valve overlap period in FIG. 8 is shifted in the table. The larger the fuel injection amount is, the larger the liquid fuel estimated amount remaining on the piston top surface 3A becomes, and the PN increases when the liquid fuel is brought into contact with the flame. However, by acquiring the valve overlap period as above, the liquid fuel amount remaining on the piston top surface 3A can be decreased. And the increase in the PN can be suppressed. Moreover, since the effect of the internal EGR can be improved as described above, the increase in the PN can be suppressed also by this.

Figure 13:
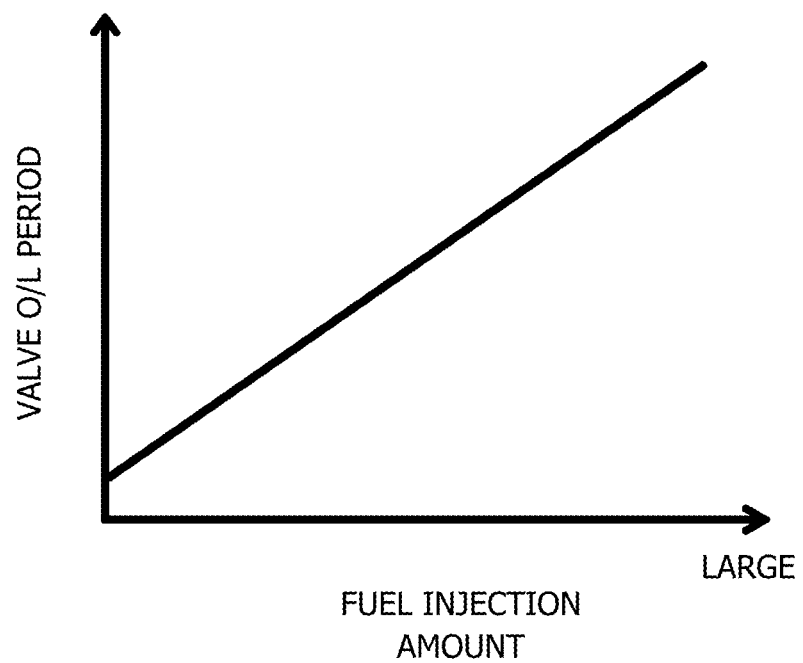
FIG. 13 is a view when the valve overlap period is changed linearly with respect to the fuel injection amount.

FIG. 13 is a view when the valve overlap period is changed linearly with respect to the fuel injection amount. As described above, even if the valve overlap period is changed linearly with respect to the fuel injection amount, the increase in the PN can be suppressed by the action similar to the above.

Figure 14:
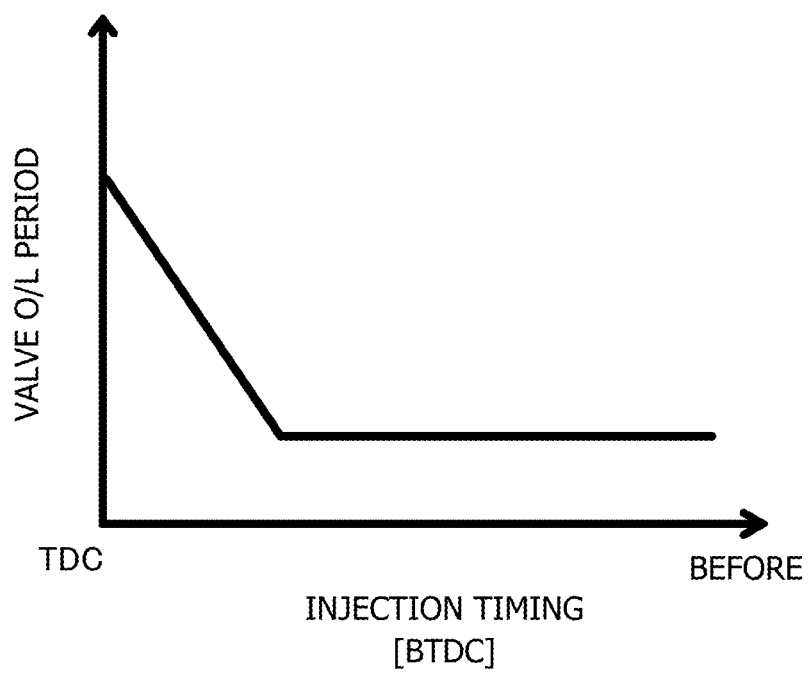
FIG. 14 is an explanatory view of the valve overlap period with respect to injection timing.

FIG. 14 is an explanatory view of the valve overlap period with respect to the injection timing. It may be so configured that the valve overlap period is acquired on the basis of the injection timing by using the table as illustrated in FIG. 14. In FIG. 14, a vertical axis indicates the valve overlap period, while a lateral axis indicates the injection timing. Here, the injection timing of the fuel is before the compression top dead center. On the lateral axis, the farther it goes to the right direction, the closer gets to the timing before the compression top dead center.

In the table in FIG. 14, it is so configured that the closer the injection timing gets to the top dead center, the longer the valve overlap period is extended. When the injection timing gets closer to the top dead center, the fuel adheres to the piston top surface 3A more easily. That is, the liquid fuel can remain on the piston top surface 3A more easily. However, here, it is set such that the closer the injection timing gets to the top dead center, the longer the valve overlap period is extended and thus, the increase in the PN can be suppressed by decreasing the remaining amount of the liquid fuel on the piston top surface 3A.

In the flowchart in FIG. 2, the processing at Steps S109 to S110 may be executed prior to the processing at Steps S107 to S108. Moreover, only either one of the processing at Steps S107 to S108 and the processing at Steps S109 to S110 may be executed.

When Step S111 is executed as the result of determination at Step S101 or Step S106, the normal control is executed. The normal control is operation control in which the uniform stoichiometric combustion is performed at MBT. By referring to FIGS. 3 and 4 again, when the top surface temperature T is at the threshold value T1 or above, the retarding amount of the ignition timing is brought to zero, and the ignition timing is made the basic ignition timing so as to execute MBT. If the top surface temperature T is at the threshold value T1 or above, the valve overlap period is set relatively short to V0. Then, it is set so that cylinder deposition efficiency becomes high by suppressing the increase in a blowout amount of intake air. For example, it is set so that the cylinder deposition efficiency becomes the highest. As a result, when the piston top surface temperature is raised, sufficient acceleration is realized for the acceleration request, even if the super-retard stratified charge combustion has been switched to the uniform stoichiometric combustion.

Summarizing the control routine described above, the controller 100 obtains the temperature T of the piston top surface 3A in the uniform stoichiometric combustion control. If the temperature T of the piston top surface 3A is at the threshold value T1 or above, the controller 100 executes the normal control in which the uniform stoichiometric combustion is performed at the MBT. On the other hand, if the temperature T on the piston top surface 3A is less than the threshold value T1, the controller 100 retards the spark ignition timing than that in the normal control and extends the valve overlap period than that in the normal control.

In the aforementioned embodiment, the ignition timing and the valve overlap period are changed in steps with respect to the piston top surface temperature, but the ignition timing and the valve overlap period may be configured to be changed linearly with respect to the piston top surface temperature.

Subsequently, an effect of this embodiment will be explained.

In this embodiment, when the exhaust gas purifying catalyst interposed in the exhaust passage 5 needs to be warmed up, the controller 100 executes a catalyst warm-up operation (super-retard stratified charge combustion) in which the fuel is injected in the compression stroke and at timing when the fuel spray collides against the piston top surface 3A and the colliding fuel spray goes toward the ignition plug 8 along the shape of the piston top surface 3A and performs spark ignition at the compression top dead center and after. Then, after the super-retard stratified charge combustion is switched to the uniform stoichiometric combustion control, if the temperature of the piston top surface 3A is lower than a predetermined temperature, the spark ignition timing is retarded so that time until the flame after the ignition reaches the piston top surface 3A becomes longer.

When the fuel spray has been made to collide against the piston top surface 3A and the super-retard stratified charge combustion has been executed, the liquid fuel can easily collect on the piston top surface 3A. In such circumstances, if the accelerator pedal is depressed larger than the predetermined amount A and enters an acceleration state, the uniform combustion is to be performed at the MBT, and the flame is brought into contact with the fuel collecting on the piston top surface 3A. Then, the PM is generated by this.

However, in this embodiment, in such circumstances, the spark ignition timing is retarded so that the time until the flame after the ignition reaches the piston top surface 3A becomes longer, the PM generation time can be shortened. Thus, the increase in the PN can be suppressed.

Moreover, as in this embodiment, it may be so configured that the larger the estimated amount of the liquid fuel remaining on the piston top surface 3A is, the more the spark ignition timing is retarded. By configuring as above, the larger the liquid fuel remaining on the piston top surface 3A is, the more difficult contact between the flame and the liquid fuel can be made to occur. Thus, by suppressing the generation of the PM, the increase in the PN can be suppressed.

Moreover, as in this embodiment, it may be so configured that the larger the fuel injection amount in the cylinder is, the larger the retarding amount of the spark ignition timing is set. If the fuel injection amount is large, the liquid fuel remaining on the piston top surface 3A is considered to increase. Thus, by configuring such that the larger the fuel injection amount is, the larger the retarding amount of the spark ignition timing is set, the contact between the flame and the liquid fuel can be made difficult to occur.

Moreover, in this embodiment, during execution of the super-retard stratified charge combustion, if the accelerator pedal is depressed larger than the predetermined amount A and the temperature of the piston top surface 3A in the cylinder is lower than the predetermined temperature, the valve overlap period is extended.

When the fuel spray is made to collide against the piston top surface 3A and the super-retard stratified charge combustion is executed, the liquid fuel can collect on the piston top surface 3A easily. In such circumstances, when the accelerator pedal is depressed by an amount larger than the predetermined amount A, since the uniform combustion is switched to the control executed at the MBT, the PN increases.

However, in this embodiment, in such circumstances, the valve overlap period is extended, and the internal EGR is increased. When the internal EGR is increased, the combustion chamber temperature can be raised by the EGR gas at a high temperature. Then, the liquid fuel on the piston top surface 3A is evaporated, and the liquid fuel collecting on the piston top surface 3A can be decreased. Thus, the increase in the PN can be suppressed.

Moreover, the EGR gas has a characteristic of lowering the combustion temperature since it lowers the oxygen concentration in the cylinder. If the combustion temperature is low, the generation of the PM can be suppressed in a chemical reaction manner. Thus, by extending the valve overlap period, the increase in the PN can be suppressed.

Moreover, as in this embodiment, it may be so configured that the larger the liquid fuel remaining on the piston top surface 3A is, the longer the valve overlap period is extended. By extending the valve overlap period, the so-called internal EGR amount can be increased. When the internal EGR amount is increased, the temperature of the piston top surface 3A is increased by using the temperature of the combustion gas, whereby the liquid fuel can be further decreased. Thus, even if the liquid fuel remaining on the piston top surface 3A becomes large, the internal EGR can be increased by extending the valve overlap period. Then, the liquid fuel remaining on the piston top surface 3A can be further evaporated.

Moreover, it may be so configured that the larger the fuel injection amount to be injected into the cylinder is, the longer the valve overlap period is extended. By extending the valve overlap period, the internal EGR amount can be increased. When the internal EGR amount is increased, the temperature of the piston top surface 3A can be further raised by using the temperature of the combustion gas and the liquid fuel can be further decreased. Thus, even if the liquid fuel remaining on the piston top surface 3A increases due to a large fuel injection amount as in the acceleration, the internal EGR amount can be increased by extending the valve overlap period. Thus, the liquid fuel remaining on the piston top surface 3A can be further evaporated.

Moreover, it may be so configured that the valve overlap period is extended if the fuel injection timing is injection timing when the liquid fuel can easily adhere to the piston top surface 3A such as in the vicinity of the piston top dead center. Even if it is likely that the liquid fuel remaining on the piston top surface 3A increases depending on the injection timing when the liquid fuel can easily adhere to the piston top surface 3A, the internal EGR amount can be increased by extending the valve overlap period. Then, the liquid fuel remaining on the piston top surface 3A can be evaporated.

Moreover, in this embodiment, when the valve overlap period is to be extended, the valve overlap period is extended such that a period from when the intake valve 6 is opened to the exhaust top dead center becomes longer than a period from the exhaust top dead center until the exhaust valve 7 is closed. By extending the valve overlap period so that the period from when the intake valve 6 is opened to the exhaust top dead center becomes longer, an amount of the internal EGR gas returning to the intake port side in the exhaust stroke can be made larger. The internal EGR gas having returned to the intake port flows into the cylinder in the subsequent intake stroke. Thus, the so-called internal EGR amount can be effectively increased.

Figure 15:
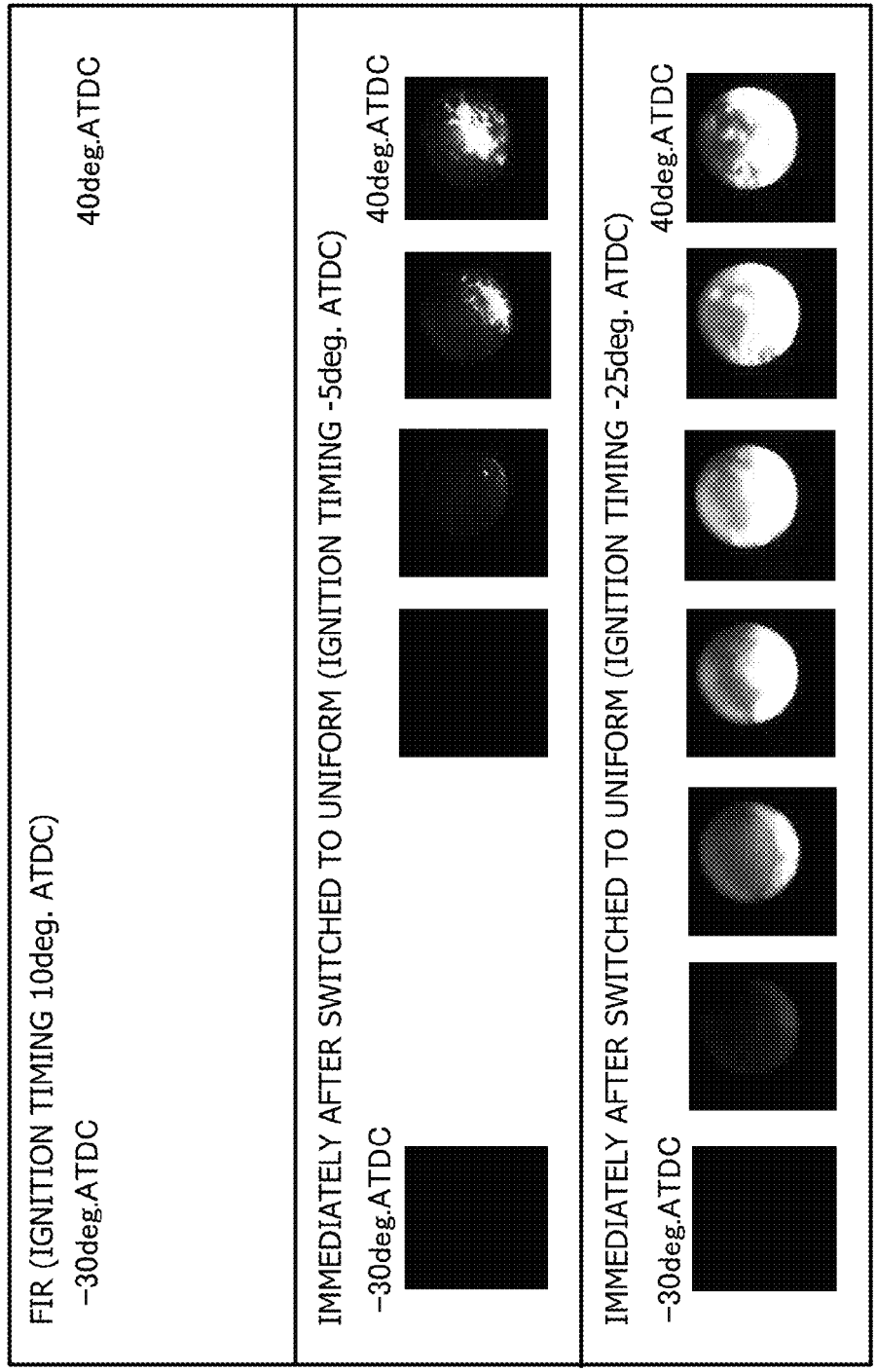
FIG. 15 is a first view for explaining an effect of ignition timing retarding.
Figure 16:
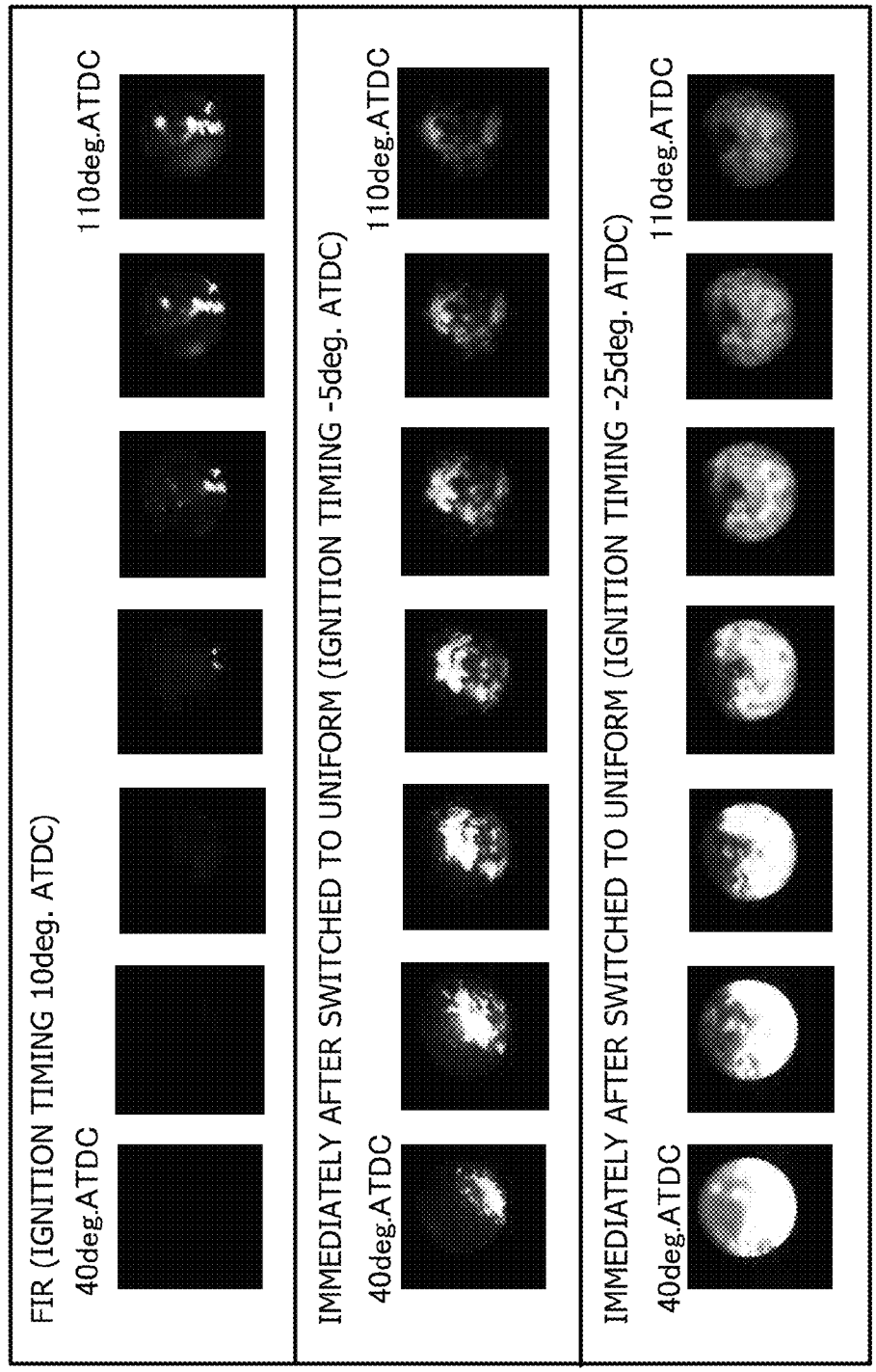
FIG. 16 is a second view for explaining an effect of ignition timing retarding.
Figure 17:
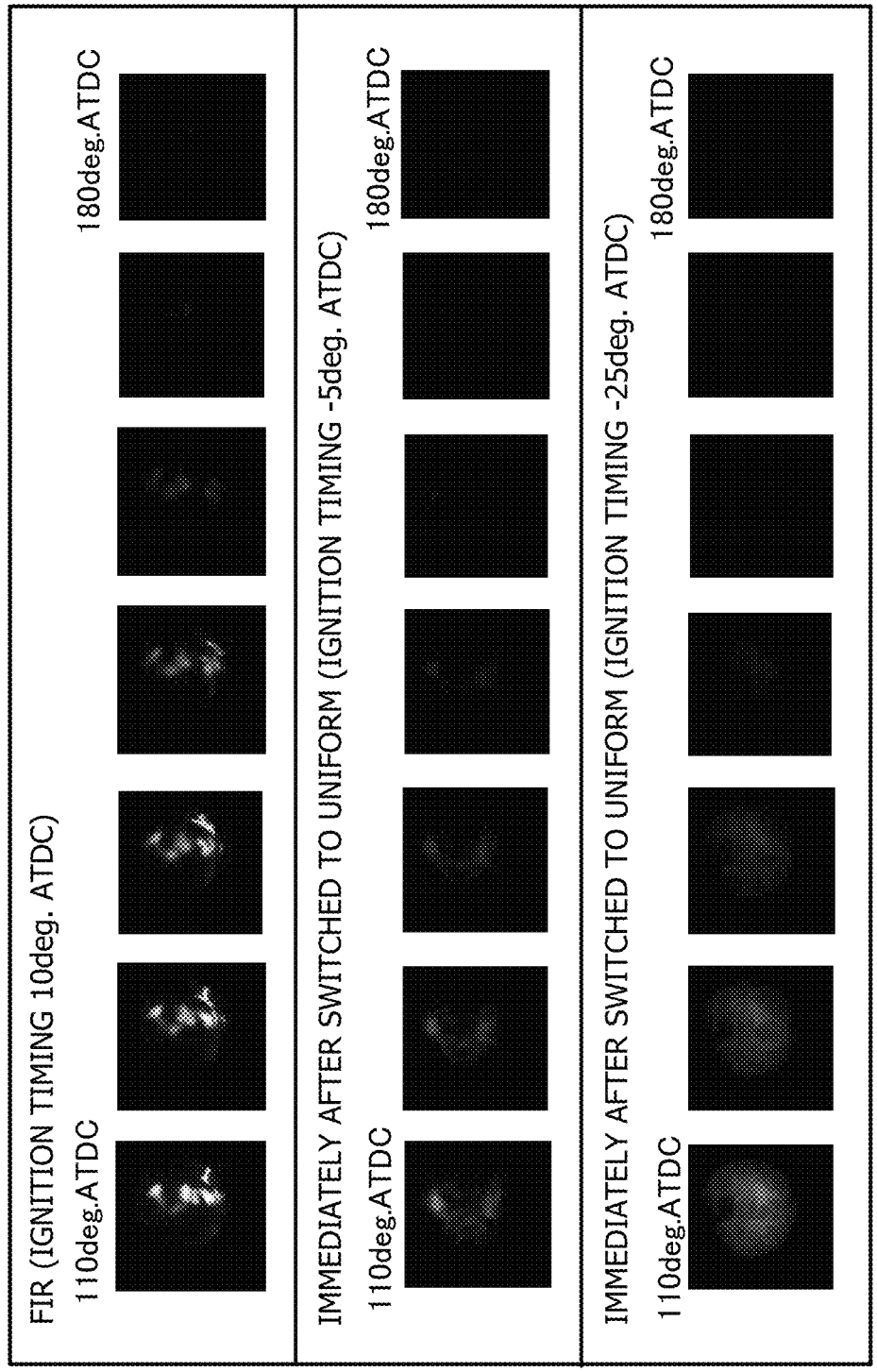
FIG. 17 is a third view for explaining an effect of ignition timing retarding.

FIG. 15 is a first view for explaining an effect of the ignition timing retard. FIG. 16 is a second view for explaining the effect of the ignition timing retard. FIG. 17 is a third view for explaining the effect of the ignition timing retard. FIGS. 15 to 17 illustrate combustion states in the combustion chamber when the ignition timing is made different. In these figures, those appearing white are luminous flames in the combustion chamber. When the luminous flame occurs, it is known that more PM is generated. That is, if a period during which the luminous flame occurs is prolonged, more PM is generated.

In FIGS. 15 to 17, an uppermost stage shows photos in the combustion chamber when the ATDC (after top dead center) 10 (deg) is set to ignition timing when the super-retard stratified charge combustion (FIR) control is executed. A medium stage shows photos in the combustion chamber when the −5 (deg) after the top dead center is set to the ignition timing immediately after the super-retard stratified charge combustion is switched to the uniform combustion. That is, they are photos in the combustion chamber when 5 (deg) before the top dead center is set to the ignition timing. A lowermost stage shows photos in the combustion chamber when the −25 (deg) is set to the ignition timing immediately after the super-retard stratified combustion is switched to the uniform combustion. That is, they are photos in the combustion chamber when the 25 (deg) before the top dead center is set to the ignition timing.

FIG. 15 shows photos from −30 (deg) after the top dead center to 40 (deg) after the top dead center. Moreover, FIG. 16 shows photos from 40 (deg) after the top dead center to 110 (deg) after the top dead center. FIG. 17 shows photos from 110 (deg) after the top dead center to 180 (deg) after the top dead center.

By referring to FIGS. 15 to 17, in the case of the super-retard stratified charge combustion (uppermost stage), the luminous flame occurs from around 70 (deg) after the top dead center to around 140 (deg) after the top dead center. However, it is found that the luminous flame is not so strong as compared with the photos at the other ignition timings.

Moreover, immediately after the super-retard stratified charge combustion is switched to the uniform combustion, if the ignition timing is set to −25 (deg) after the top dead center (lowermost stage), the luminous flame occurs from around −10 (deg) after the top dead center (that is, around 10 (deg) before top dead center) to around 120 (deg) after the top dead center. And it is found that intensity of these luminous flames is stronger than those at the other ignition timings.

On the other hand, immediately after the super-retard stratified charge combustion is switched to the uniform combustion as in this embodiment, if the ignition timing is set to −5 (deg) after the top dead center (medium stage), the luminous flame occurs from around 20 (deg) after the top dead center to around 120 (deg) after the top dead center. That is, these periods during which the luminous flames occur are shorter than the case where the ignition timing is set to −25 (deg) after the top dead center. Moreover, it is found that intensity of the luminous flames is weaker than the case where the ignition timing is set to −25 (deg) after the top dead center.

As described above, by retarding the ignition timing as in this embodiment, the flame does not reach the piston top surface 3A easily and thus, the occurrence period of the luminous flame can be shortened. And the increase in the PN can be suppressed. Moreover, the combustion temperature is also lowered by the effect of the internal EGR. As a result, the increase in the PN can be further suppressed.

Figure 18:
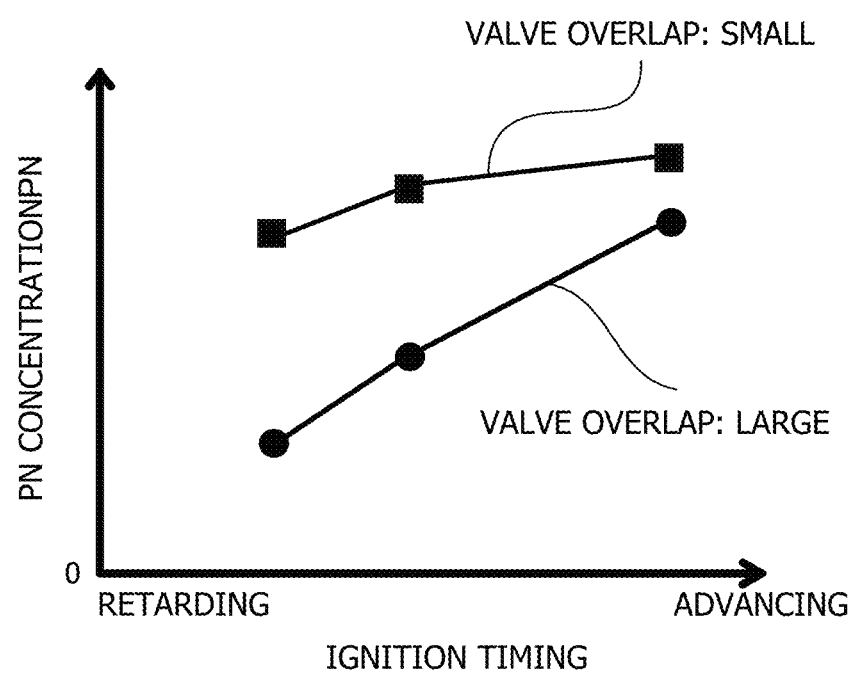
FIG. 18 is a view illustrating a relationship among the ignition timing, valve overlap, and PN concentration.

FIG. 18 is a view illustrating a relationship among the ignition timing, and the valve overlap, and the PN concentration. In FIG. 18, a lateral axis indicates the ignition timing, while a vertical axis indicates the PN concentration. FIG. 18 shows a result when the valve overlap is small and a result when the valve overlap is extended.

According to these results, it is known that the PN concentration can be made smaller if the valve overlap is extended. Moreover, it is known that the effect is further improved by retarding the ignition timing.

Second Embodiment

After the valve overlap period is acquired as described above, the valve overlap period may be corrected as follows.

Figure 19:
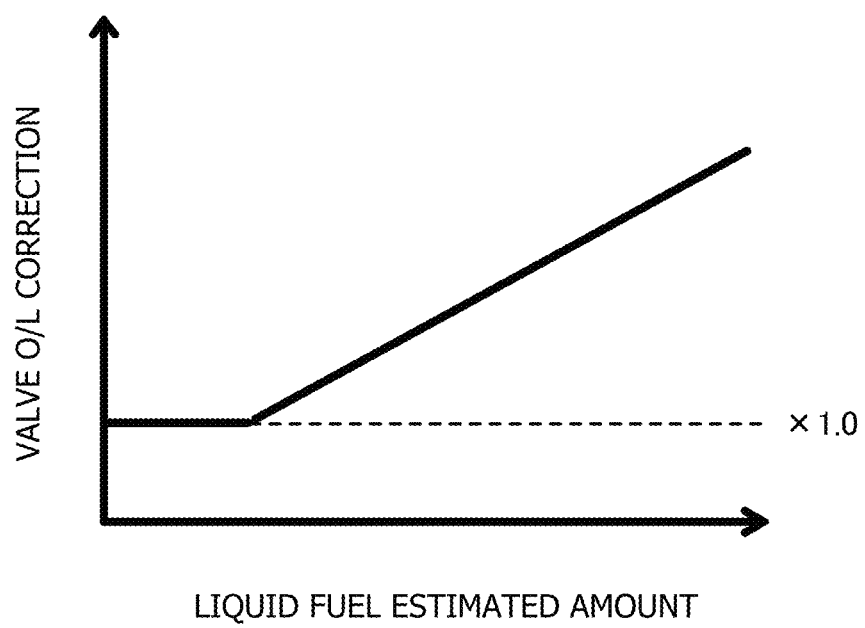
FIG. 19 is an explanatory view of a valve overlap correction amount with respect to the liquid fuel estimated amount in a second embodiment.
Figure 20:
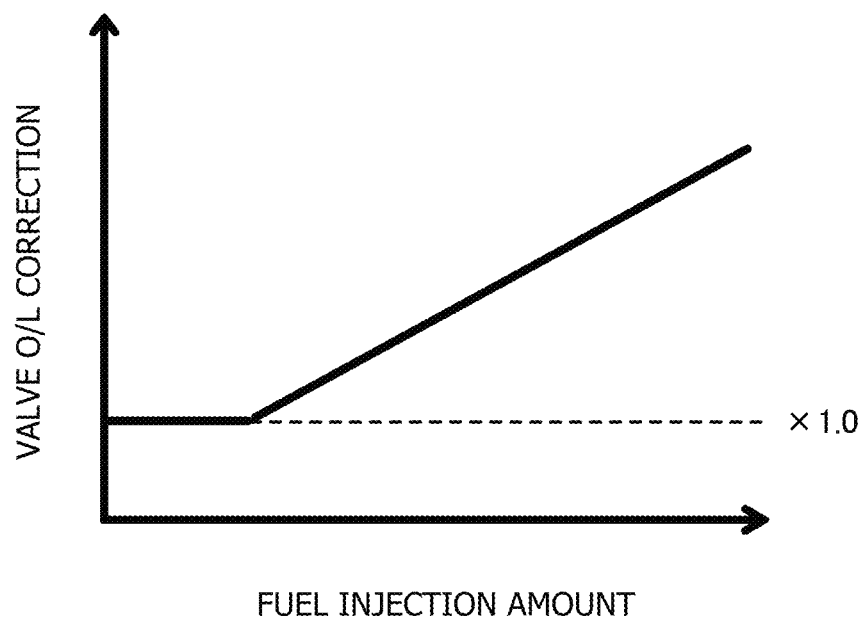
FIG. 20 is an explanatory view of the valve overlap correction amount with respect to the fuel injection amount in the second embodiment.

FIG. 19 is an explanatory view of a valve overlap correction amount with respect to the liquid fuel estimated amount in a second embodiment. FIG. 20 is an explanatory view of the valve overlap correction amount with respect to the fuel injection amount in the second embodiment.

A corrected valve O/L amount is acquired by using an equation as follows:

Corrected valve O/L period=valve O/L period×(correction value(liquid fuel estimated amount)+correction value(fuel injection amount)−1

In the equation above, the "valve O/L period" is a valve overlap period acquired in the end in the aforementioned embodiment. Here, the already acquired valve overlap period is corrected by a correction amount, and the corrected valve overlap period is acquired. Then, the valve overlap control is executed by using the corrected valve overlap period.

Moreover, in the equation above, the "correction value (liquid fuel estimated amount)" is a function illustrated in FIG. 19. Moreover, in the equation above, the "correction amount (fuel injection amount)" is a function illustrated in FIG. 20. That is, here, the valve overlap period acquired by the temperature of the piston top surface 3A is corrected by the correction value acquired from the liquid fuel estimated amount and the correction value acquired from the fuel injection amount.

By configuring as above, the more proper valve overlap period can be acquired by correcting the valve overlap period acquired by the temperature of the piston top surface 3A by the liquid fuel estimated amount and the fuel injection amount.

The embodiments of the present invention have been described above, but the aforementioned embodiments only illustrate a part of an application example of the present invention and are not intended to limit a technical range of the present invention to the specific configuration of the aforementioned embodiments.

Each of the aforementioned embodiments is described as independent embodiments, respectively, but may be combined as appropriate.

The invention claimed is:

1. An engine controller that controls a direct fuel-injection engine including
   a fuel injection valve arranged to directly inject a fuel into a cylinder, and
   a valve overlap period adjusting mechanism configured to adjust a valve overlap period between an open period of an intake valve and an open period of an exhaust valve,
   the engine controller comprising:
   an acceleration request sensor configured to detect an acceleration request of a driver, wherein
   when the acceleration request occurs and a top surface temperature of a piston in the cylinder obtained on the basis of a detection value of a cooling water temperature sensor is a temperature at which a liquid fuel adhering to a top surface of the piston is brought over in a liquid state to the subsequent cycle, the valve overlap period between the open period of the intake valve and the open period of the exhaust valve, which overlap period ranges before and after an exhaust top dead center, is extended.

2. The engine controller according to claim 1, wherein
   the liquid fuel amount remaining on the piston top surface is estimated on the basis of the piston top surface temperature; and
   the larger the liquid fuel amount remaining on the piston top surface is, the longer the valve overlap period is extended.

3. The engine controller according to claim 1, wherein
   the larger the fuel injection amount injected into the cylinder is, the longer the valve overlap period is extended.

4. The engine controller according to claim 1, wherein
   when the acceleration request occurs and the piston top surface temperature in the cylinder is lower than the predetermined temperature, and when an injection timing of the fuel is an injection timing, a liquid fuel injected at which timing adheres to the piston top surface, the valve overlap period is extended.

5. The engine controller according to claim 1, wherein
   when the valve overlap period is to be extended, the valve overlap period is extended so that a period from a timing when the intake valve is opened to the exhaust top dead center becomes longer than a period from the exhaust top dead center until a timing when the exhaust valve is closed.

6. The engine controller according to claim 1, wherein
   the extended valve overlap period is corrected according to at least one of the liquid fuel amount remaining on the piston top surface or the fuel injection amount injected into the cylinder.

7. The engine controller according to claim 1, wherein
   when the piston top surface temperature is a predetermined temperature or above, the valve overlap period is set to a valve overlap period through which a cylinder volumetric efficiency becomes the maximum.

8. An engine control method for controlling a direct fuel-injection engine including
  a fuel injection valve arranged to directly inject a fuel into a cylinder,
  a valve overlap period adjusting mechanism configured to adjust a valve overlap period between an open period of an intake valve and an open period of an exhaust valve, and
  an acceleration request sensor configured to detect an acceleration request of a driver, wherein
  when the acceleration request occurs and a top surface temperature of a piston in the cylinder obtained on the basis of a detection value of a cooling water temperature sensor is a temperature at which a liquid fuel adhering to a top surface of the piston is brought over in a liquid state to the subsequent cycle, the valve overlap period between the open period of the intake valve and the open period of the exhaust valve, which overlap period ranges before and after an exhaust top dead center, is extended.

\* \* \* \* \*